US012054988B1

(12) United States Patent
Hsieh

(10) Patent No.: US 12,054,988 B1
(45) Date of Patent: Aug. 6, 2024

(54) OBSTACLE DETECTION DEVICE AND DOOR OPERATOR SYSTEM EQUIPPED WITH THE SAME

(71) Applicant: Chung Hsien Hsieh, New Taipei (TW)

(72) Inventor: Chung Hsien Hsieh, New Taipei (TW)

( * ) Notice: Subject to any disclaimer, the term of this patent is extended or adjusted under 35 U.S.C. 154(b) by 0 days.

(21) Appl. No.: 18/474,340

(22) Filed: Sep. 26, 2023

(30) Foreign Application Priority Data

Apr. 17, 2023 (TW) ................................ 112114192

(51) Int. Cl.
*E05F 15/00* (2015.01)
*E06B 9/70* (2006.01)
*E06B 9/68* (2006.01)

(52) U.S. Cl.
CPC ........ *E06B 9/70* (2013.01); *E06B 2009/6836* (2013.01)

(58) Field of Classification Search
CPC .......................... E06B 9/70; E06B 2009/6836
USPC ...................................... 49/26, 28, 197, 199
See application file for complete search history.

(56) References Cited

U.S. PATENT DOCUMENTS 6,070,641 A 6/2000 Budetti
7,055,283 B2 * 6/2006 Hsieh ...................... E05F 15/40 160/188
7,061,197 B1 * 6/2006 Mullet .................... E05F 15/41 318/471
8,397,787 B1 * 3/2013 Daus ....................... E05F 15/71 160/1
9,234,377 B2 * 1/2016 Schatz ...................... E06B 3/44
10,000,960 B2 * 6/2018 Angiuli .................... E05F 15/40
11,643,861 B2 * 5/2023 Williams .............. E05D 13/003 49/199

FOREIGN PATENT DOCUMENTS

AU 2015234340 A1 5/2016
CN 206753458 U 12/2017
TW 201005168 A 2/2010

OTHER PUBLICATIONS

TW Office Action dated Sep. 21, 2023 in Taiwan application No. 112114192.

* cited by examiner

*Primary Examiner* — Jerry E Redman
(74) *Attorney, Agent, or Firm* — McClure, Qualey & Rodack, LLP

(57) ABSTRACT

An obstacle detection device and a door operator includes a hollow bearing, a slide pin, an output bushing, an elastic member, and a sensor, wherein the slide pin is inserted into a through slot of the hollow bearing. One end of the slide pin is accommodated in an open groove of the output bushing, and the elastic member is accommodated in the hollow bearing and is adapted to apply a biasing force to the slide pin. The sensor is disposed on one side of the open groove of the output bushing. During a normal operation, the hollow bearing drives the output bushing to rotate synchronously through the slide pin. When an obstacle is encountered and the output bushing cannot rotate synchronously with the hollow bearing, the output bushing causes the slide pin to be guided by the open groove and slide, thereby triggering or detriggering the sensor.

10 Claims, 6 Drawing Sheets

OBSTACLE DETECTION DEVICE AND DOOR OPERATOR SYSTEM EQUIPPED WITH THE SAME

FIELD OF THE INVENTION

The present invention relates to an obstacle detection device and a door operator system, especially a slatted panel door system, an electric rolling door system, or a rolling curtain system, equipped with the same.

DESCRIPTION OF THE PRIOR ART

Regardless of being in an electric rolling door system or a slatted panel door system, the most common obstacle detection mechanism is to install a photoelectric sensor on the left and right sides of the door frame, wherein one side is a transmitting end, and the other side is a receiving end. Once there is an obstacle between the transmitting end and the receiving end, and the obstacle blocks a detection light sent by the transmitting end, the motor will be deactivated, that is, the slats will stop descending.

However, in many situations, the traditional obstacle detection mechanism using the photoelectric sensor may misjudges or fails. For example, due to the influence of external light sources, even if there is an obstacle, it cannot be detected smoothly; in addition, there is also a situation where an obstacle, such as a transparent object or a hollowed-out object, cannot block the detection light.

Therefore, when the obstacle detection mechanism misjudges or fails, it may cause the slats to hit the obstacle. If the obstacle is a human body, it may affect life safety.

SUMMARY OF THE INVENTION

The main objective of the present invention is to provide an obstacle detection device and a door operator system equipped with the same, which can perform a detection task effectively and make a response immediately when an obstacle is encountered or the slats are stuck.

To achieve the above objective, an obstacle detection device of the present invention mainly comprises a hollow bearing, a slide pin, an output bushing, an elastic member, and a sensor, wherein the hollow bearing includes a through slot; the slide pin is inserted into the through slot; the output bushing is fitted on the hollow bearing and includes an open groove, one end of the slide pin is accommodated in the open groove, the open groove includes a bottom wall, a first side wall, and a second side wall, an included angle between the first side wall and the bottom wall is less than or equal to 90 degrees, and an included angle between the second side wall and the bottom wall is greater than 90 degrees; the elastic member is accommodated in the hollow bearing and is adapted to apply a biasing force to the slide pin; the sensor is arranged on an opening side of the open groove of the output bushing. During a normal operation, the hollow bearing drives the output bushing to rotate synchronously through the slide pin; when an obstacle is encountered and the output bushing cannot rotate synchronously with the hollow bearing, the output bushing causes the slide pin to be guided by the second side wall of the open groove and slide, thereby triggering or detriggering the sensor.

Accordingly, in the present invention, the slide pin is driven to slide along the second side wall of the open groove so as to trigger or detrigger the sensor in different situations in which the hollow bearing and the output bushing have different torques in direction and magnitude, thereby achieving obstacle or fault detection. In this way, the actuation principle of the present invention entirely relies on the real feedback of the output end (the output bushing), rather than relying on additional detection devices, so the probability of misjudgment or failure is greatly reduced, and it is safe, reliable and has a long service life.

Moreover, the present invention can be applied not only to a slatted door system equipped with a counterbalance mechanism which can preload a torque, such as a slatted panel door system, but also to a general electric rolling door system, a curtain system, or other equivalent lifting systems.

DETAILED DESCRIPTION OF THE INVENTION

Figure 1:
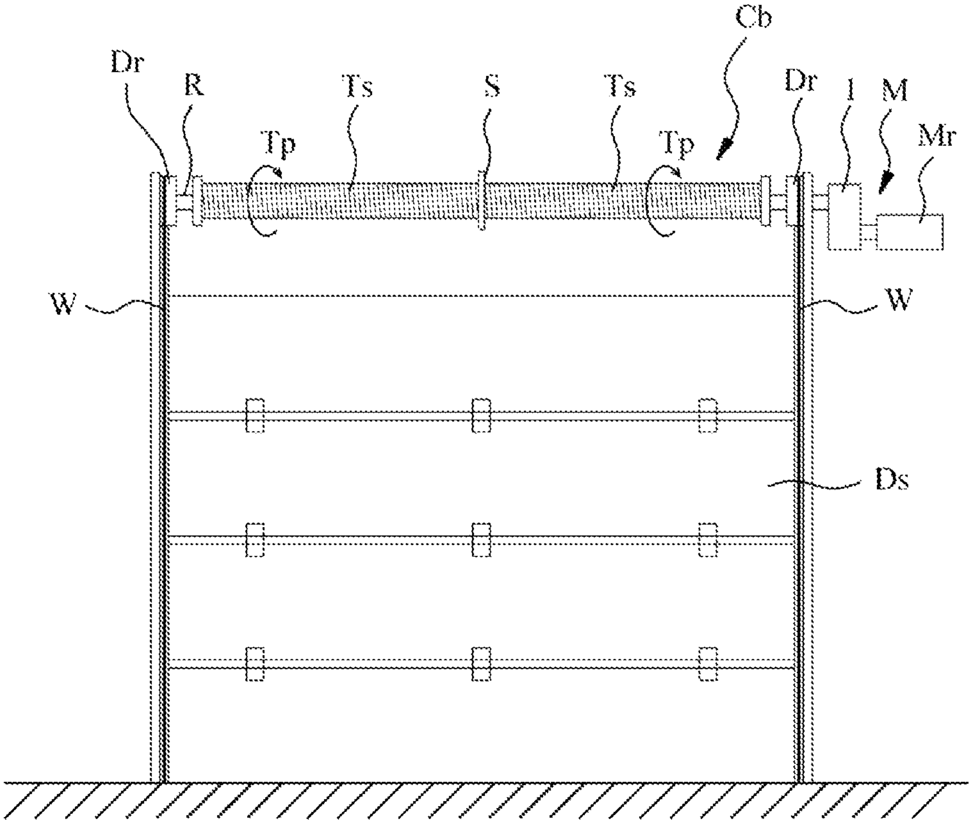
FIG. 1 is a schematic diagram of a door operator system according to a first embodiment of the present invention.

Before an obstacle detection device and a door operator system equipped with the same of the present invention are described in detail in embodiments, it should be noted that in the following description, similar components will be designated by the same reference numerals. Furthermore, the drawings of the present invention are for illustrative purposes only, they are not necessarily drawn to scale, and not all details are necessarily shown in the drawings.

Please refer to FIG. 1 first, which is a schematic diagram of a door operator system equipped with an obstacle detection device according to a first embodiment of the present invention. The first embodiment will be described below using a slatted panel door system as an example. As shown in the figure, the door operator system of the present embodiment mainly includes a shaft R, a counterbalance mechanism Cb, two cable drums Dr, slats Ds, two cables W, and a driving device M. The driving device M includes a motor Mr and an obstacle detection device 1. The two cable drums Dr are disposed on the two side ends of the shaft R, one end of each of the two cables W is connected to one of the two cable drums Dr respectively, and the other end of each of the two cables W is connected to one of the two sides of the bottom end of the slats Ds respectively.

The counterbalance mechanism Cb of the present embodiment mainly includes two torsional springs Ts, which are fitted on the shaft R, wherein one ends of the torsional springs Ts are connected to a spring support S, which is installed on a wall, and the other ends of the torsional springs Ts are connected to the shaft R, that is, the torsional springs Ts are used to preload a pre-torque Tp on the shaft R.

Figure 2:
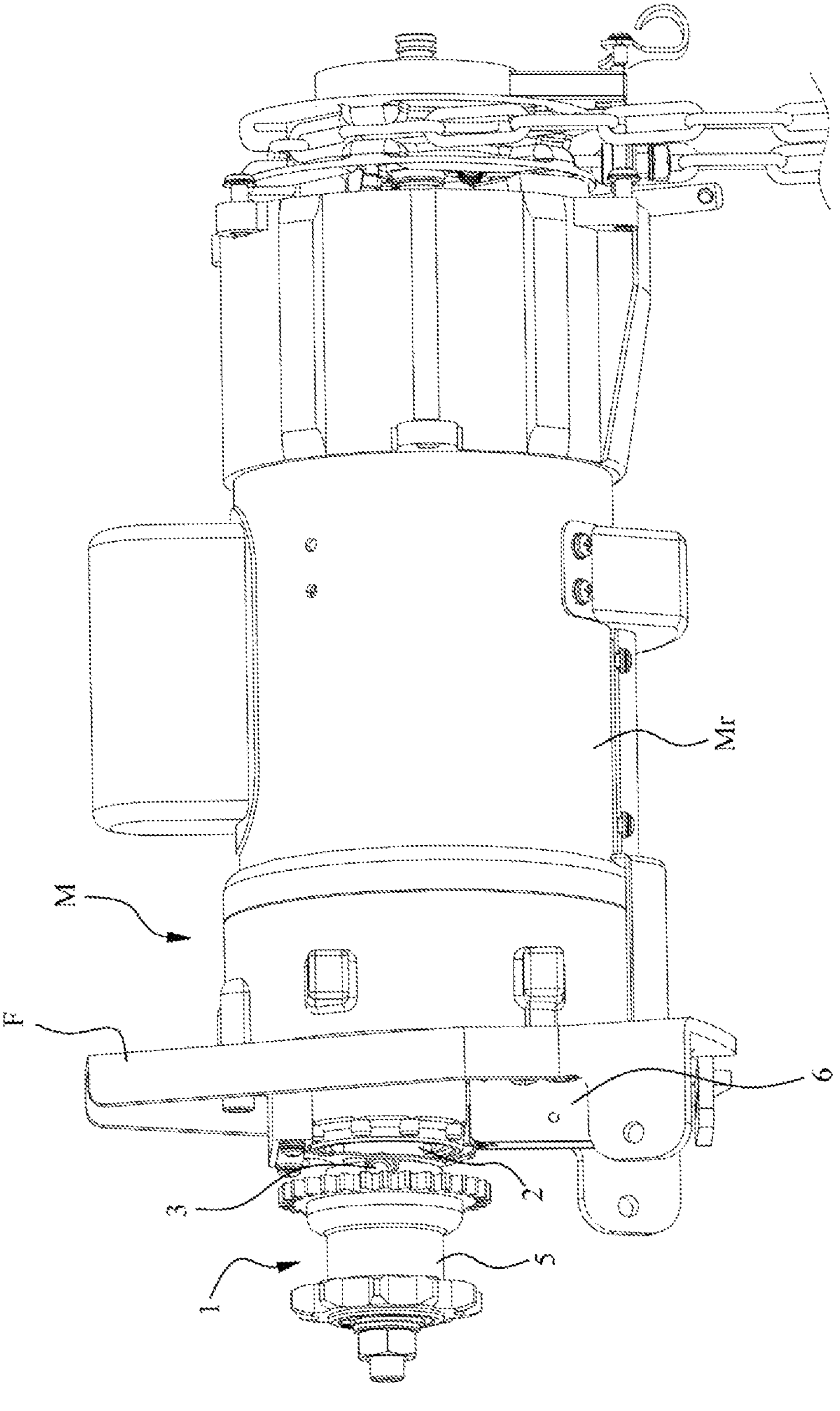
FIG. 2 is a perspective view of a driving device in the first embodiment of the present invention.
Figure 3:
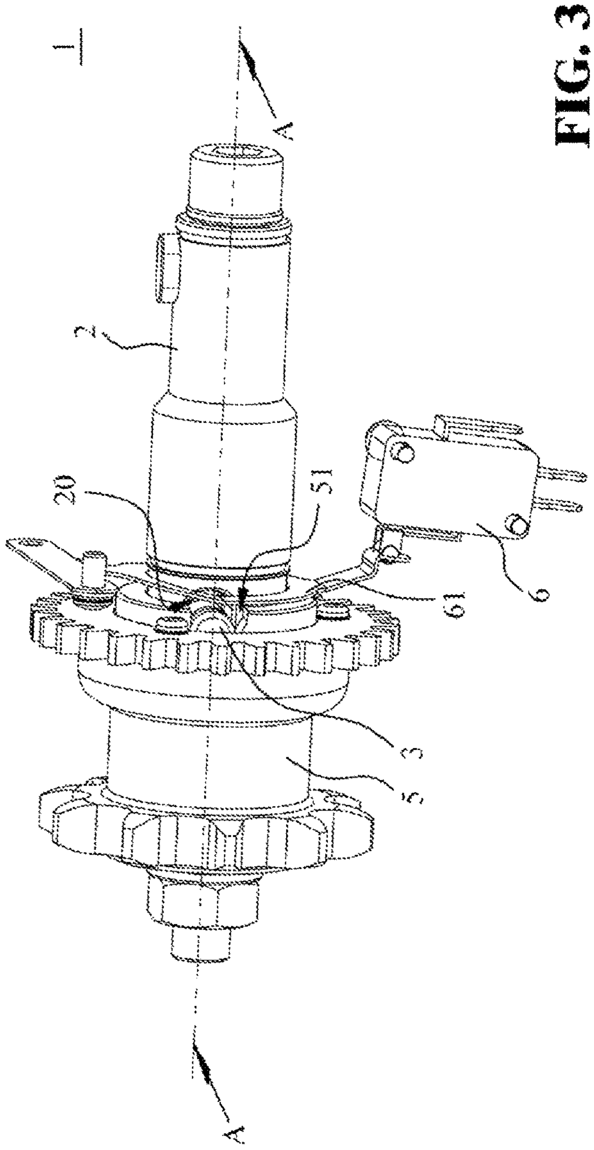
FIG. 3 is a perspective view of an obstacle detection device in the first embodiment of the present invention.
Figure 4:
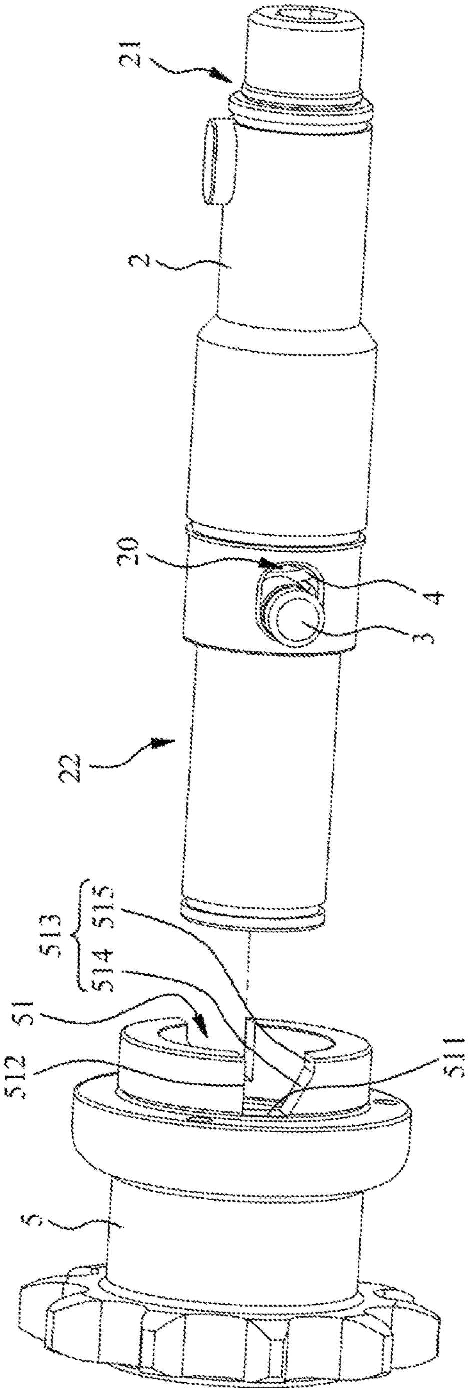
FIG. 4 is an exploded view of the obstacle detection device in the first embodiment of the present invention, wherein a sensor has been removed.
Figure 5:
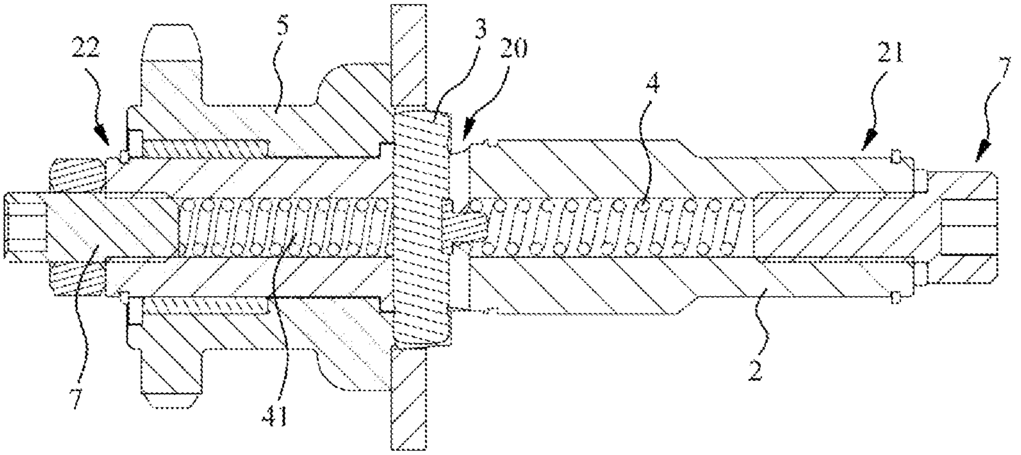
FIG. 5 is a cross-sectional view taken along a line A-A of FIG. 3.

Please refer to FIG. 2, FIG. 3, FIG. 4, and FIG. 5 together. FIG. 2 is a perspective view of the driving device in the first embodiment of the present invention; FIG. 3 is a perspective view of the obstacle detection device in the first embodiment of the present invention; FIG. 4 is an exploded view of the obstacle detection device in the first embodiment of the present invention, wherein a sensor has been removed; and FIG. 5 is a cross-sectional view taken along a line A-A of FIG. 3.

As shown in the figures, the obstacle detection device 1 of the present embodiment mainly includes a hollow bearing 2, a slide pin 3, an output bushing 5, and a sensor 6. Among them, the hollow bearing 2 includes an input end 21, an output end 22 and a through slot 20, wherein the input end 21 is coupled to the motor Mr, the output bushing 5 is fitted on the output end 22, the through slot 20 is correspondingly arranged in the side wall of the hollow bearing 2, and the long axis direction of the through slot 20 is consistent with the axial direction of the hollow bearing 2. The slid pin 3 is inserted into the through slot 20, that is, it directly penetrates the hollow bearing 2 radially and protrudes outward.

The output bushing 5 includes two open grooves 51, the opening direction of which faces the input end 21 of the hollow bearing 2, and the two ends of the slide pin 3 are accommodated in the two open grooves 51 respectively. Each open groove 51 includes a bottom wall 511, a first side wall 512 and a second side wall 513, wherein the included angle between the first side wall 512 and the bottom wall 511 is 90 degrees, and the included angle between the second side wall 513 and the bottom wall 511 is greater than 90 degrees, such as 120 degrees adopted in the present embodiment. The second side wall 513 includes an inclined portion 514 and a straight portion 515, wherein one end of the inclined portion 514 is connected to the bottom wall 511, and the other end is connected to the straight portion 515. The included angle between the inclined portion 514 and the bottom wall 511 is 120 degrees, and the straight portion 515 is parallel to the first side wall 512.

Furthermore, two elastic members (i.e., a first elastic member 4 and a second elastic member 41) are accommodated in the hollow bearing 2, are arranged on the two sides of the slide pin 3 respectively, and are adapted to apply biasing forces to the slide pin 3. In addition, the input end 21 and the output end 22 of the hollow bearing 2 are each provided with an adjustment screw 7, and the two adjustment screws 7 abut against the first elastic member 4 and the second elastic member 41, thereby adjusting the biasing forces applied to the slide pin 3, respectively. A sensor 6 is disposed on a mount F, can be a micro switch, and includes an extension arm 61, which straddles the opening sides of the open grooves 51.

Figure 6A:
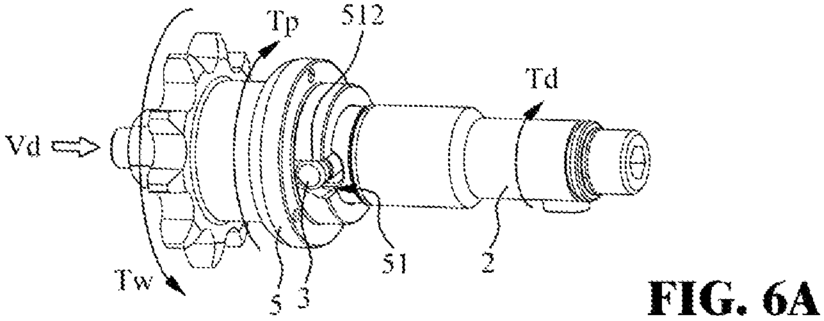
FIGS. 6A, 6B, and 6C show perspective views of the obstacle detection device in the first embodiment when a door is normally opened, is normally closed, and encounters an obstacle, respectively.
Figure 6B:
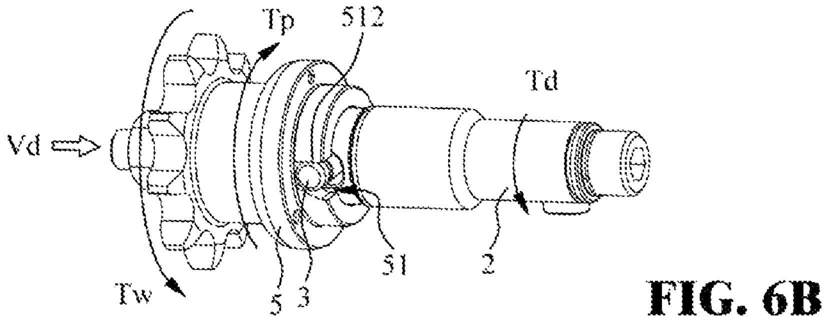
Figure 6C:
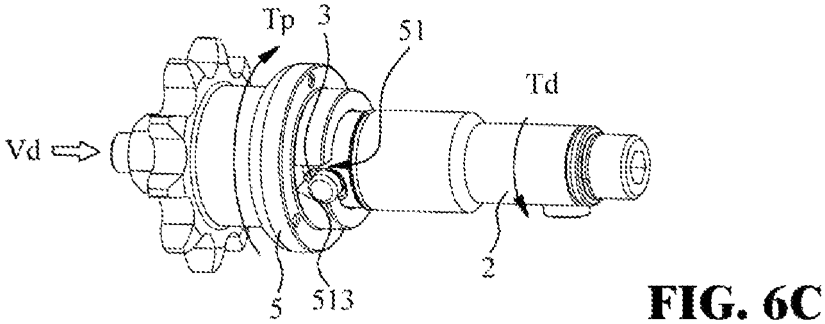
Figure 7A:
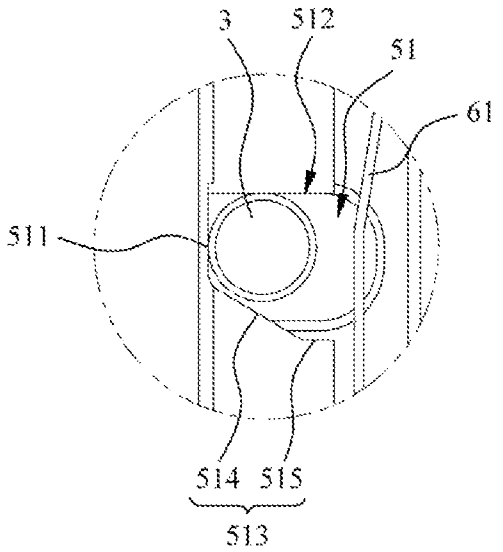
FIGS. 7A and 7B shows partial enlarged views in which a slide pin detriggers and triggers the sensor in the first embodiment, respectively.
Figure 7B:
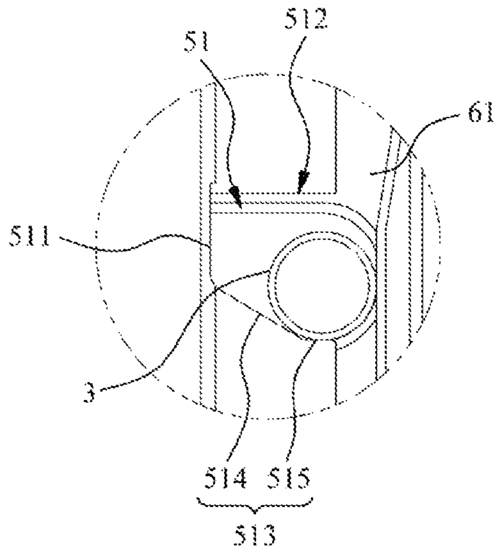

Please refer to FIG. 6A to FIG. 7B at the same time. FIGS. 6A, 6B, and 6C show perspective views of the obstacle detection device in the first embodiment when a door is normally opened, is normally closed, and encounters an obstacle, respectively. FIGS. 7A and 7B shows partial enlarged views in which the slide pin detriggers and triggers the sensor in the first embodiment, respectively. The actual operation principle of this embodiment will be explained below. When the door operator system is in operation, the motor Mr drives the hollow bearing 2 to rotate, that is, it applies a driving torque Td to the hollow bearing 2 while the weight of the slats Ds also generates a gravitational torque Tw to the output bushing 5.

Please referring to FIG. 6A, when the slats Ds are to be raised, the direction of the driving torque Td is the same as that of the pre-torque Tp, and the two torques are in balance with the gravitational torque Tw. As viewed in an observation direction Vd from the output end 22, the motor Mr drives the hollow bearing 2 counterclockwise, and the hollow bearing 2 drives the slide pin 3 to rotate counterclockwise, so the slide pin 3 abuts against the first side walls 512 of the open grooves 51 (as shown in FIG. 7A) and makes the output bushing 5 rotate counterclockwise, and as a result, the cables are pulled to open the door.

Please referring to FIG. 6B, when the slats Ds are to be lowered, the direction of the driving torque Td is the same as that of the gravitational torque Tw, and the two torques are in balance with the pre-torque Tp. As viewed in the observation direction Vd from the output end 22, the motor Mr drives the hollow bearing 2 clockwise, the hollow bearing 2 rotates the slide pin 3 clockwise, and the gravitational torque Tw generated by the weight of the slats Ds also drives the output bushing 5 clockwise. Therefore, the slide pin 3 still abuts against the first side walls 512 of the open grooves 51 (as shown in FIG. 7A) when rotated clockwise, thereby closing the slats Ds.

Please referring to FIG. 6C, when the slats Ds are lowered and encounters an obstacle or the slats Ds get stuck, the gravitational torque Tw generated by the weight of the slats Ds is offset by the obstacle, and at this time, the direction of the pre-torque Tp is opposite to that of the driving torque Td. As viewed in the observation direction Vd from the output end 22, the motor Mr drives the hollow bearing 2 clockwise, the hollow bearing 2 rotates the slide pin 3 clockwise, and the output bushing 5 is rotated counterclockwise due to the influence of the pre-torque Tp.

Now, the slide pin 3 will abut against the second side walls 513 of the open grooves 51, overcome the biasing force applied by the first elastic member 4, slide along the inclined portions 514 to the straight portions 515 and then stop, and push the extension arm 61 so as to trigger the sensor 6. This is regarded as an abnormal state, as shown in FIG. 7B. When the sensor 6 is triggered, the motor Mr can be deactivated immediately to prevent the slats Ds from descending further, or the slats Ds can even be raised directly. Accordingly, it will be possible to completely avoid loosening the cables W from the cable drums Dr, thereby preventing the slats Ds from descending. Moreover, it is also possible to avoid the situation that the weight of the slats Ds is completely added to the obstacle due to the continuous release of the cables W by the cable drums Dr.

On the whole, in the present embodiment, for example, when the slats Ds encounter an obstacle during their descent and stop the descent, the slats are stuck due to a mechanical failure, or the slats Ds are decelerated due to other reasons, the door operator system can perform a detection task accurately and make a response immediately through real feedback such as the rotation direction and torque of the output end (the output bushing 5) of the door operator system. Moreover, the obstacle detection means of the present embodiment adopts the principle of mechanical actuation, which is safe, stable, reliable, and has a long service life.

Figure 8:
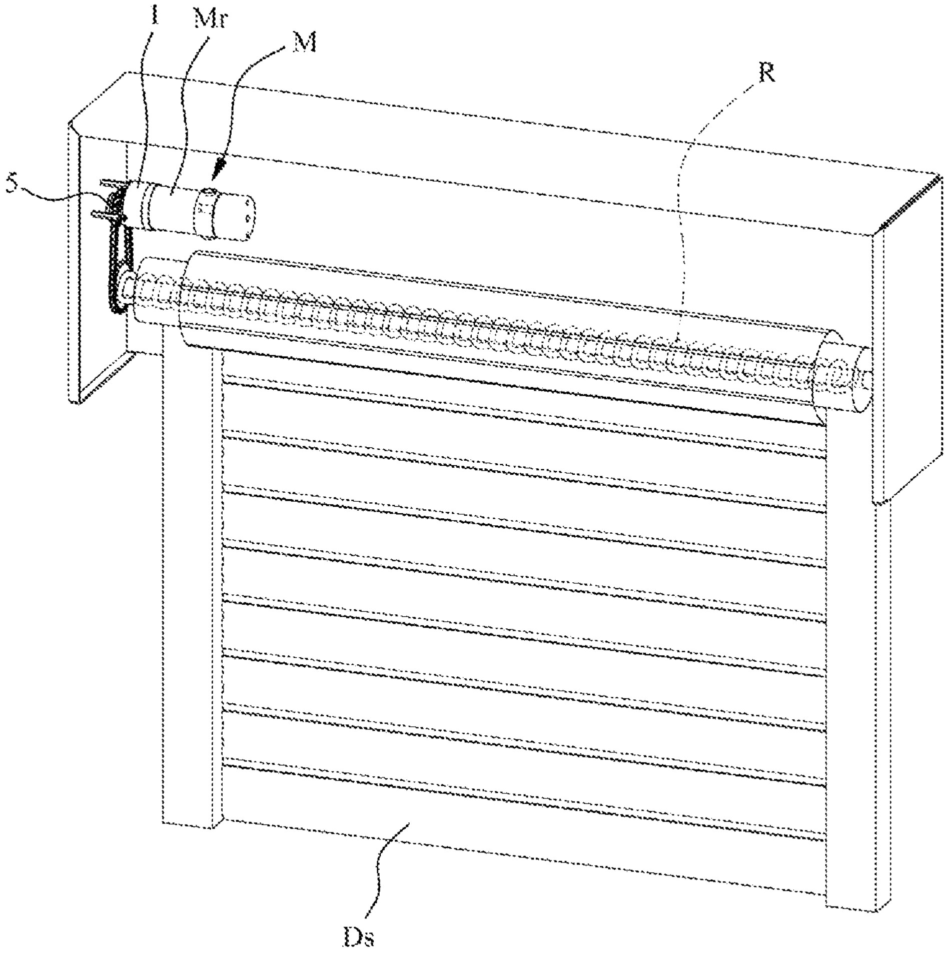
FIG. 8 is a schematic diagram of a door operator system equipped with an obstacle detection device according to a second embodiment of the present invention.
Figure 9A:
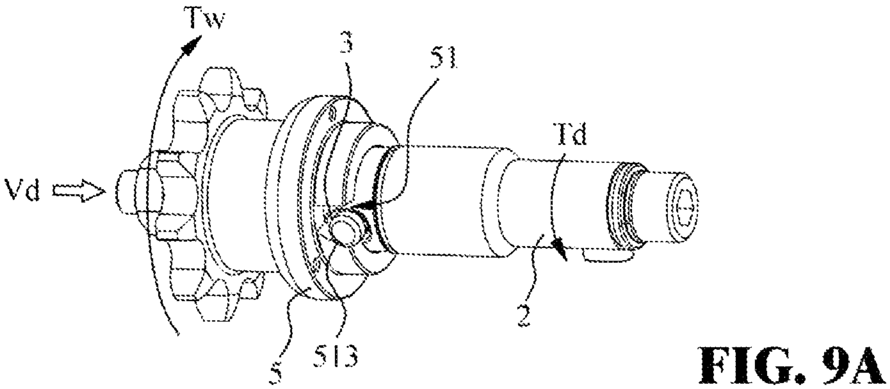
FIGS. 9A, 9B, and 9C show perspective views of the obstacle detection device in the second embodiment when a door is normally opened, is normally closed, and encounters an obstacle, respectively.
Figure 9B:
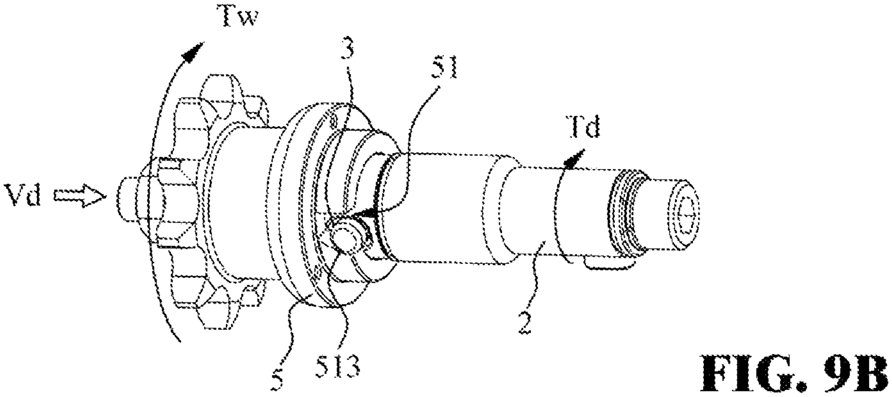
Figure 9C:
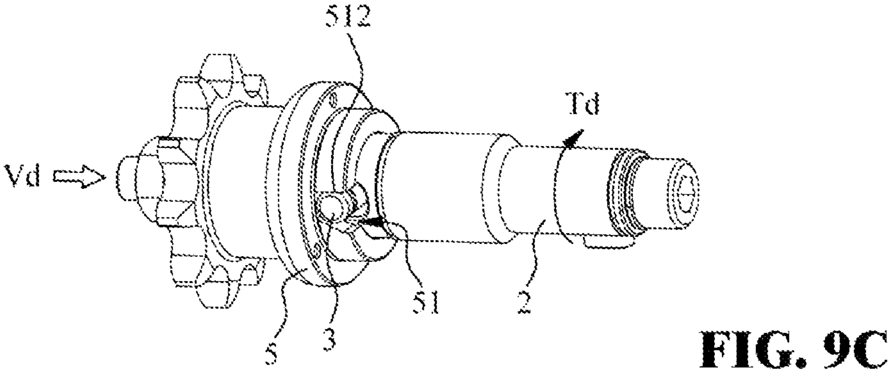

Please refer to FIGS. 8 to 9C at the same time. FIG. 8 is a schematic diagram of a door operator system equipped with an obstacle detection device according to a second embodiment of the present invention. FIGS. 9A, 9B, and 9C show perspective views of the obstacle detection device in the second embodiment when a door is normally opened, is normally closed, and encounters an obstacle, respectively. This embodiment is mainly used to illustrate that the present invention can also be applied to an electric rolling door system, a curtain system, or other similar lifting systems that do not have a counterbalance mechanism. The following will take the electric rolling door system as an example for illustration.

As shown in FIG. 8, the door operator system of the present embodiment mainly includes a shaft R, slats Ds, and a driving device M, wherein the shaft R is used for winding or unwinding the slats Ds, and is kinematically connected to the driving device M. In other words, the driving device M will drive the shaft R to rotate through a chain so that the shaft R can wind the slats Ds to be in an open state or unwind the slats Ds to be in a closed state. Similarly, the driving device M of the present embodiment mainly includes a motor Mr and an obstacle detection device 1, the specific configuration of which is the same as that of the first embodiment described above.

Please refer to FIGS. 9A to 9C at the same time. The actual operation principle of the present embodiment will be described below. When the door operator system is in operation, the motor Mr drives the hollow bearing 2 to rotate, that is, it applies a driving torque Td to the hollow bearing 2 while the weight of the slats Ds also generates a gravitational torque Tw to the output bushing 5.

Please referring to FIG. 9A, when the slats Ds are to be raised, the direction of the driving torque Td is opposite to that of the gravitational torque Tw. As viewed in the observation direction Vd from the output end 22, the motor Mr drives the hollow bearing 2 clockwise while the direction of the gravitational torque Tw is counterclockwise, so the hollow bearing 2 rotates the slide pin 3 clockwise. At this time, the slide pin 3 will abut against the second side walls 513 of the open grooves 51, overcome the biasing force applied by the first elastic member 4, slide along the inclined portions 514 to the straight portions 515 and then stop, and push the extension arm 61 to trigger the sensor 6, as shown in FIG. 7B. In the present embodiment, when the sensor 6 is triggered, it is regarded as a normal (open) state by the system.

Please referring to FIG. 9B, when the slats Ds are to be lowered, the direction of the driving torque Td is the same as that of the gravitational torque Tw. As viewed in the observation direction Vd from the output end 22, the motor Mr drives the hollow bearing 2 counterclockwise, the direction of the gravitational torque Tw is also counterclockwise, and the gravitational torque Tw is greater than the driving torque Td, so the slide pin 3 still abuts against the second side walls 513 of the open grooves 51 at this time and continues triggering the sensor 6, as shown in FIG. 7B. Likewise, in the present embodiment, when the sensor 6 is triggered, it is regarded as a normal (closed) state by the system Please referring to FIG. 9C, when the slats Ds are lowered and encounters an obstacle or the slats Ds get stuck, the gravitational torque Tw generated by the weight of the slats Ds is offset by the obstacle, and the driving torque Td and the biasing forces of the elastic members will drive the slide pin 3 away from the second side walls 513, thereby detriggering the sensor 6.

It is further illustrated that as viewed in the observation direction Vd from the output end 22, the motor Mr drives the hollow bearing 2 counterclockwise, and the hollow bearing 2 drives the slide pin 3 to rotate counterclockwise so that the slide pin 3 turns into contact with the first side walls 512 of the open grooves 51. At this time, the rightward pushing forces caused by the second side walls 513 are missing, and the rightward biasing force of the second elastic member 41 is smaller than the leftward biasing force of the first elastic member 4 (see FIG. 5). Therefore, the slide pin 3 moves back from the second side walls 513 to the first side walls 512 (see FIG. 7A), the extension arm 61 also returns to its original position, and the sensor 6 is detriggered. As a result, the system determines that it is an abnormal state, and the motor Mr will be deactivated.

It can be seen from the above that the present invention can be applied to almost all roll-type lifting systems. Once the change in the force direction or magnitude of the shaft R (the output end) is unexpected, it will be automatically fed back to the system and determined as an abnormal state. Moreover, the operation mode of the system of the present invention is quite flexible, and the triggering or detriggering state of the sensor 6 can be set as a normal state or an abnormal state.

The above-mentioned embodiments are only examples for the convenience of description, and the scope of the present invention should be subject to the claims, rather than limited to the above-mentioned embodiments.

The invention claimed is:

1. An obstacle detection device, comprising:

a hollow bearing, including a through slot;

a slide pin, inserted into the through slot;

an output bushing, fitted on the hollow bearing and including an open groove, one end of the slide pin being accommodated in the open groove, the open groove including a bottom wall, a first side wall, and a second side wall, an included angle between the first side wall and the bottom wall being less than or equal to 90 degrees, and an included angle between the second side wall and the bottom wall being greater than 90 degrees;

at least one elastic member, accommodated in the hollow bearing and adapted to apply a biasing force to the slide pin; and a sensor, arranged on an opening side of the open groove of the output bushing, wherein during a normal operation, the hollow bearing drives the output bushing to rotate synchronously through the slide pin; when an obstacle is encountered and the output bushing cannot rotate synchronously with the hollow bearing, the output bushing causes the slide pin to be guided by the second side wall of the open groove and slide, thereby triggering or detriggering the sensor.

2. The obstacle detection device of claim 1, further comprising at least one adjustment screw, wherein the hollow bearing further includes an input end and an output end; the at least one adjustment screw is locked on at least one of the input end and the output end and abuts against the at least one elastic member, thereby adjusting the magnitude of the biasing force applied to the slide pin.

3. The obstacle detection device of claim 1, wherein the hollow bearing is coupled to a motor, which is adapted to apply a driving torque to the hollow bearing; the output bushing is coupled to a counterbalance mechanism, which is adapted to apply a pre-torque to the output bushing; during the normal operation, the slide pin abuts against the first side wall of the open groove; when the obstacle is encountered, the direction of the pre-torque is opposite to the direction of the driving torque so that the slide pin overcomes the biasing force applied by the at least one elastic member and slides along the second side wall of the open groove, thereby triggering the sensor.

4. The obstacle detection device of claim 1, wherein the hollow bearing is coupled to a motor, which is adapted to apply a driving torque to the hollow bearing; during the normal operation, the driving torque causes the slide pin to overcome the biasing force applied by the at least one elastic member and slide along the second side wall of the open groove, thereby triggering the sensor; when the obstacle is encountered, the driving torque and the biasing force of the at least one elastic member drive the slide pin away from the second side wall, thereby detriggering the sensor.

5. The obstacle detection device of claim 1, wherein the second side wall of the open groove includes an inclined portion and a straight portion; one end of the inclined portion is connected to the bottom wall, and the other end of the inclined portion is connected to the straight portion; an included angle between the inclined portion and the bottom wall is greater than 90 degrees; and the straight portion is parallel to the first side wall.

6. A door operator system, comprising a shaft, a counterbalance mechanism, at least one cable drum, a slat, at least one cable, and a driving device, wherein the counterbalance mechanism is adapted to apply a pre-torque to the shaft; the at least one cable drum is disposed on the shaft; one end of the at least one cable is connected to the at least one cable drum, and the other end of the at least one cable is connected to the slat; the driving device comprises:

a motor;

a hollow bearing, kinematically connected to the motor and including a through slot;

a slide pin, inserted into the through slot;

an output bushing, fitted on the hollow bearing, kinematically connected to the shaft, and including an open groove, one end of the slide pin being accommodated in the open groove, the open groove including a bottom wall, a first side wall, and a second side wall, an included angle between the first side wall and the bottom wall being less than or equal to 90 degrees, and an included angle between the second side wall and the bottom wall being greater than 90 degrees;

at least one elastic member, accommodated in the hollow bearing and adapted to apply a biasing force to the slide pin; and a sensor, arranged on an opening side of the open groove of the output bushing, wherein during a normal operation, the slide pin abuts against the first side wall of the open groove, the motor drives the hollow bearing, and the hollow bearing rotates the output bushing synchronously; when an obstacle is encountered, the output bushing causes the slide pin to be guided by the second side wall of the open groove and slide, thereby triggering the sensor.

7. The door operator system of claim 6, wherein when the obstacle is encountered, the direction of the pre-torque applied by the counterbalance mechanism is opposite to the rotation direction of the hollow bearing so that the slide pin overcomes the biasing force applied by the at least one elastic member and slides along the second side wall of the open groove, thereby triggering the sensor.

8. The door operator system of claim 7, wherein when the slat is to be raised in the normal operation, the motor applies a driving torque to the hollow bearing, the direction of the driving torque is the same as the direction of the pre-torque, and the two torques are in balance with a gravitational torque generated by the weight of the slat; when the slat is to be lowered in the normal operation, the direction of the driving torque is the same as the direction of the gravitational torque, and the two torques are in balance with the pre-torque applied by the counterbalance mechanism.

9. A door operator system, comprising a shaft, a slat, and a driving device, wherein the shaft is used for winding or unwinding the slat; the shaft is kinematically connected to the driving device; the driving device comprises:

a motor;

a hollow bearing, kinematically connected to the motor and including a through slot;

a slide pin, inserted into the through slot;

an output bushing, fitted on the hollow bearing, kinematically connected to the shaft, and including an open groove, one end of the slide pin being accommodated in the open groove, the open groove including a bottom wall, a first side wall, and a second side wall, an included angle between the first side wall and the bottom wall being less than or equal to 90 degrees, and an included angle between the second side wall and the bottom wall being greater than 90 degrees;

at least one elastic member, accommodated in the hollow bearing and adapted to apply a biasing force to the slide pin; and a sensor, arranged on an opening side of the open groove of the output bushing, wherein during a normal operation, the motor drives the hollow bearing, and the slide pin abuts against the second side wall of the open groove and triggers the sensor; when an obstacle is encountered, the motor drives the slide pin away from the second side wall, thereby detriggering the sensor.

10. The door operator system of claim 9, wherein the motor is adapted to apply a driving torque to the output bushing; during the normal operation, the output bushing is affected by the driving torque so that the slide pin overcomes the biasing force applied by the at least one elastic member and slides along the second side wall of the open groove, thereby triggering the sensor; when the obstacle is encountered, the driving torque and the biasing force of the at least one elastic member drive the slide pin away from the second side wall, thereby detriggering the sensor.

* * * * *